(12) United States Patent
Grubbauer et al.

(10) Patent No.: US 10,711,836 B2
(45) Date of Patent: Jul. 14, 2020

(54) BEARING ASSEMBLY FOR SUPPORTING A SCREW-COMPRESSOR ROTOR AND METHOD FOR ASSEMBLING A SCREW COMPRESSOR

(71) Applicant: Aktiebolaget SKF, Gothenburg (SE)

(72) Inventors: Thomas Grubbauer, Sankt Ulrich (AT); Tom De Rooster, Leest-Mechelen (BE)

(73) Assignee: AKTIEBOLAGET SKF, Gothenburg (SE)

( * ) Notice: Subject to any disclaimer, the term of this patent is extended or adjusted under 35 U.S.C. 154(b) by 142 days.

(21) Appl. No.: 15/837,035

(22) Filed: Dec. 11, 2017

(65) Prior Publication Data

US 2018/0202488 A1    Jul. 19, 2018

(30) Foreign Application Priority Data

Dec. 12, 2016  (DE) .................. 10 2016 224 670

(51) Int. Cl.
| | |
|---|---|
| *F16C 19/16* | (2006.01) |
| *F16C 19/54* | (2006.01) |
| *F16C 25/06* | (2006.01) |
| *F01C 21/02* | (2006.01) |
| *F16C 35/063* | (2006.01) |
| *F04C 18/16* | (2006.01) |
| *F16C 35/06* | (2006.01) |

(52) U.S. Cl.
CPC ............ *F16C 19/163* (2013.01); *F01C 21/02* (2013.01); *F04C 18/16* (2013.01); *F16C 19/54* (2013.01); *F16C 19/541* (2013.01); *F16C 19/542* (2013.01); *F16C 25/06* (2013.01); *F16C 35/061* (2013.01); *F16C 35/063* (2013.01); *F04C 2230/60* (2013.01); *F04C 2240/52* (2013.01); *F16C 2240/34* (2013.01); *F16C 2360/43* (2013.01)

(58) Field of Classification Search
CPC ...... F16C 19/163; F16C 19/54; F16C 19/541; F16C 19/542; Y10T 16/5377
See application file for complete search history.

(56) References Cited

U.S. PATENT DOCUMENTS

| 7,588,371 B2 * | 9/2009 | Moller ................. F16C 19/166 384/454 |
| 2004/0142808 A1 * | 7/2004 | Mackel ..................... B04B 9/12 494/82 |

* cited by examiner

*Primary Examiner* — Jason L Vaughan
*Assistant Examiner* — Amanda Kreiling
(74) *Attorney, Agent, or Firm* — J-Tek Law PLLC; Scott T. Wakeman; Mark A. Ussai

(57) ABSTRACT

A bearing assembly for supporting a screw-compressor rotor includes a shaft having a center of mass, at least one angular contact ball bearing mounted on the shaft, and at least one cylindrical roller bearing mounted on the shaft. A spacing from the angular contact ball bearing to the center of mass is shorter than a spacing from the cylindrical roller bearing to the center of mass.

13 Claims, 1 Drawing Sheet

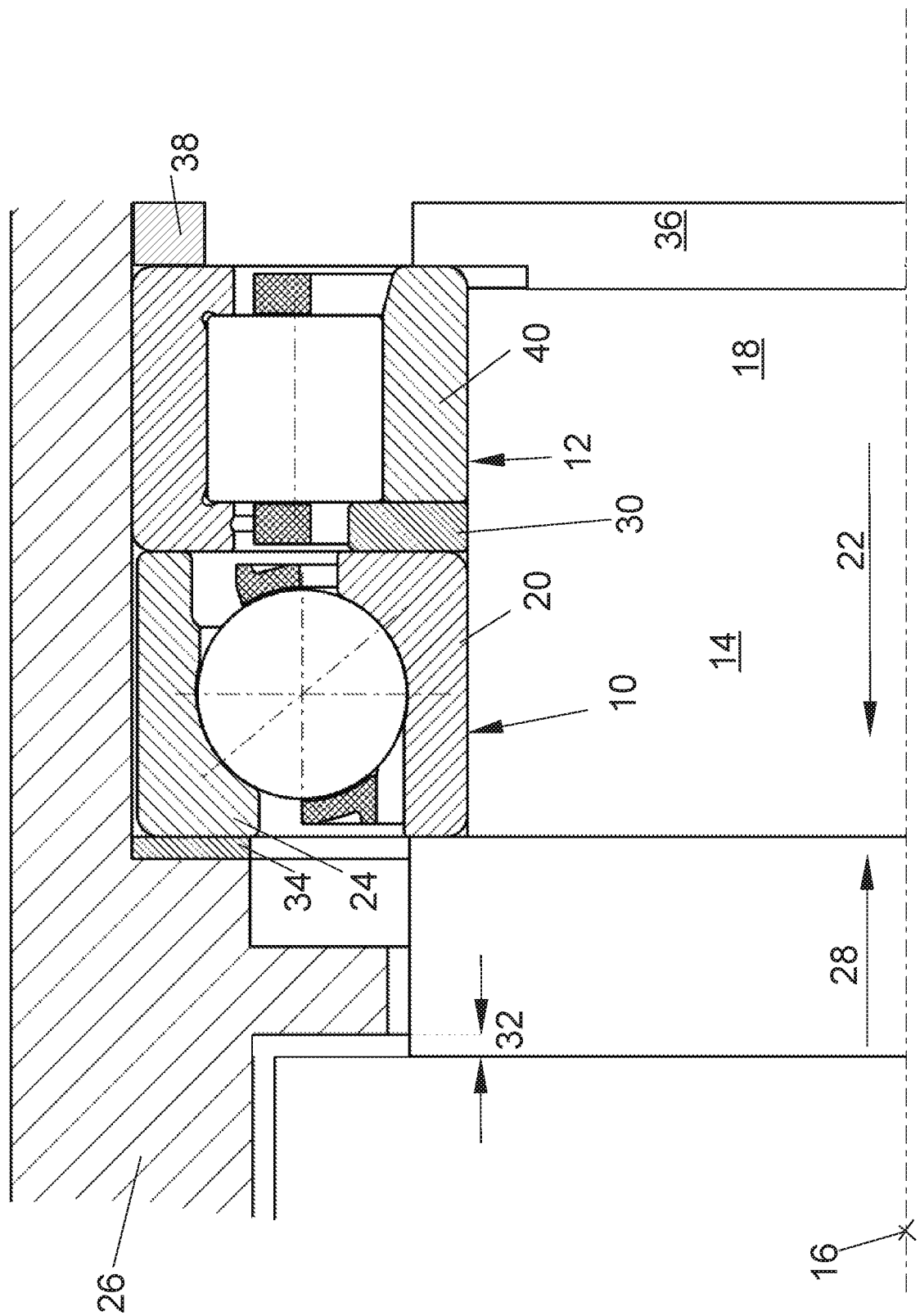

BEARING ASSEMBLY FOR SUPPORTING A SCREW-COMPRESSOR ROTOR AND METHOD FOR ASSEMBLING A SCREW COMPRESSOR

CROSS-REFERENCE

This application claims priority to German patent application no. 10 2016 224 670.4 filed on Dec. 12, 2016, the contents of which are fully incorporated herein by reference.

TECHNOLOGICAL FIELD

The disclosure is directed to a bearing assembly for supporting a screw-compressor rotor which assembly includes at least one angular contact ball bearing, at least one cylindrical roller bearing, and a shaft.

BACKGROUND

A screw compressor is known that includes a bearing assembly, which bearing assembly includes a shaft, an angular contact ball bearing and a cylindrical roller bearing in NJ design. The angular contact ball bearing and the cylindrical roller bearing are attached to the shaft, and the shaft supports a screw of the screw compressor. The cylindrical roller bearing is disposed closer to a center of mass of the shaft than the angular contact ball bearing. The two bearings are delivered in a processed state to the manufacturer of the screw compressor such that the desired head spacing of the screw compressor is set after the bearing is installed between a housing that was previously matched to the bearing and a shaft matched to the housing and the bearing. In other words, the two bearings are already preadjusted. Further preadjusted bearings, which fulfill the same purpose, can be the following: a cylindrical roller bearing in NU design together with a four-point bearing, or a cylindrical roller bearing with two angular contact ball bearings. Alternatively bearings are also used for manufacturing a screw compressor which are not preadjusted, with the result that such an adjusting occurs during an assembling of the screw compressor. The last-mentioned bearings are typically purchased more economically by the screw-compressor manufacturer.

SUMMARY

One aspect of the disclosure comprises achieving a high efficiency.

The disclosure is directed to a bearing assembly for supporting a screw compressor including at least one angular contact ball bearing, at least one cylindrical roller bearing, and a shaft on which the two bearings are disposed.

According to the disclosure, the angular contact ball bearing has a shorter spacing from a center of mass of the shaft than the cylindrical roller bearing. This allows a high efficiency to be achieved. In particular, low costs for manufacturing the bearing assembly and in particular for adjusting a head spacing of the screw compressor can be achieved. In particular, it can be achieved that accuracies of axial dimensions of the cylindrical roller bearing have at most a small significance for an adjusting of the head spacing of the screw compressor.

According to an additional aspect of the disclosure, the housing includes a housing shoulder and the shaft includes a shaft shoulder, the at least one angular contact ball bearing includes an inner ring and an outer ring and a plurality of rolling elements disposed between the inner ring and the outer ring, and the at least one cylindrical roller bearing includes an inner ring and an outer ring and a plurality of roller elements disposed between the inner ring of the at least one cylindrical roller bearing and the outer ring of the at least one cylindrical roller bearing. The bearing assembly also includes a first disc between the outer ring of the at least one angular contact ball bearing and a second disc between in inner ring of the at least one angular contact ball bearing and the inner ring of the at least one cylindrical roller bearing. The first disc may be in direct contact with the housing shoulder and the outer ring of the at least one angular contact ball bearing, and the second disc may be in direct contact with the inner ring of the at least one angular contact ball bearing and the inner ring of the cylindrical roller bearing. The outer ring of the angular contact ball bearing may be in direct contact with the outer ring of the at least one cylindrical roller bearing. The outer ring of the at least one cylindrical roller bearing may include a first flange and a second flange, and the inner ring of the at least one cylindrical roller bearing may be flangeless.

As used herein, bearings having NJ design have two integral flanges on the outer ring and one on the inner ring, can accommodate axial displacement of the shaft relative to the housing in one direction only, are used to locate the shaft axially in one direction, and can be used together with an appropriate angle ring to stabilize the bearing in the other axial direction. Bearings having NU design have two integral flanges on the outer ring and no flanges on the inner ring, can accommodate axial displacement of the shaft relative to the housing in both directions, and can be used together with an appropriate angle ring to stabilize the bearing in the axial direction. Bearings having NUP design have two integral flanges on the outer ring and one integral flange and one non-integral flange, i.e. a loose flange ring, on the inner ring and may be used to locate the shaft axially in both directions.

Further advantages arise from the following description of the drawing. An exemplary embodiment of the invention is depicted in the drawing. The drawing, the description, and the claims contain numerous features in combination. The person skilled in the art will also advantageously consider the features individually and in further meaningful combinations.

BRIEF DESCRIPTION OF THE DRAWING

FIG. 1 is a side elevational view, partly in section, through a bearing assembly according to the disclosure.

DETAILED DESCRIPTION

FIG. 1 shows a partial section through a part of a screw compressor including a bearing assembly according to the disclosure. The bearing assembly supports a rotor of the screw compressor that includes a screw. A shaft 14 of the bearing assembly is part of the rotor. Furthermore, the screw assembly includes an angular contact ball bearing 10 and a cylindrical roller bearing 12. An inner ring 20 of the angular contact ball bearing 10 and an inner ring 40 of the cylindrical roller bearing 12 are disposed directly on the shaft 14. The angular contact ball bearing 10 has a shorter spacing from a center of mass 16 of the shaft 14 than the cylindrical roller bearing 12. Furthermore, the cylindrical roller bearing 12 is disposed on an end region 18 of the shaft 14.

Furthermore, the cylindrical roller bearing 12 has an NJP design. This means that the outer ring of the cylindrical roller bearing 12 includes two flanges and the inner ring 40 itself includes no flange, but rather a disc 30 of the cylindrical roller bearing 12 forms a flange for the inner ring 40.

The inner ring 20 of the angular contact ball bearing 10 abuts end-side on a shoulder of the shaft 14. An opposite end side of this inner ring 20 abuts on the disc 30. During the installation of the two bearings on the shaft 14, the angular contact ball bearing 10 is attached to the shaft 14 first. Then, directly after this step, a head spacing 32 of the screw compressor, which head spacing 32 is also present in a fully assembled state of the screw compressor, can already be measured and is measured. To measure the head spacing the shaft 14 is moved axially back and forth. This measuring represents an advantage in comparison to the prior art, wherein a measuring of the head spacing is only possible when a complete assembling of the assembly has already occurred. The head spacing is already measurable with certainty in this stage of the assembling, since it is defined once the angular contact ball bearing 10 is completely installed on the shaft. That is, a position of the end side of the outer ring of the angular contact ball bearing 10, which is facing the center of mass, defines the head spacing relative to position of the end side of the inner ring of the angular contact ball bearing, which is also facing the center of mass.

After attaching the angular contact ball bearing 10 to the shaft 14 and after the measuring, the cylindrical roller bearing 12 whose part is the disc 30 is attached to the shaft 14 and then a screw 36 is screwed onto the shaft 14, which screw 36 presses the inner rings and the disc 30 against the shoulder of the shaft 14, and furthermore an attachment element is fixed to a housing 26 of the screw compressor, which attachment element presses the two bearings against a disc 34 and against a shoulder of the housing. The outer ring 24 of the angular contact ball bearing 10 abuts on the disc 34, and the disc 34 is disposed in axial direction 28 between the outer ring 24 and the shoulder of the housing.

In practically almost all situations where a force acts on the shaft 14 in an axial direction and attempts to move the shaft 14 relative to the housing, this force will point in that axial direction 22 which points toward the center of mass 16 starting from the end region 18. If such a force acts on the shaft 14, then the screw 36 transmits this force to the inner ring 20, which in turn transmits the force onto the outer ring 24 of the angular contact ball bearing and thus ultimately onto the housing 26.

Starting from a zero position, the shaft 14 can be moved toward the bearings 10, 12 by the distance of the axial bearing clearance of the bearing assembly relative to the housing by a force being exerted on the shaft 14 in a direction 28 that is opposite the direction 22. The axial bearing clearance is defined by the disc 30. It can be ground end-side such that the appropriate bearing clearance is set. Alternatively an appropriate disc can also be simply chosen from a set of discs having different thicknesses. End sides of the outer ring of the cylindrical roller bearing 12 then do not need to be processed. A precise setting of the head spacing is very important since the head spacing determines the performance of the screw compressor.

Both the angular contact ball bearing 10 and the cylindrical roller bearing 12 are single-row.

One advantage of the described arrangement is that the two bearings can be delivered to a manufacturer of the screw compressor with the correct axial bearing clearance already set (it is assumed that the disc 34 is already set) so the bearing can be installed without an adjustment process to obtain the correct head spacing. Effort that arises in an adjustment process is thus avoided. Furthermore, there is also less effort in the manufacturing of the bearings than in the bearing assemblies known from the prior art for a rotor of a screw compressor.

In comparison to a bearing assembly of a shaft wherein first a cylindrical roller bearing and subsequently an angular contact ball bearing are attached, the inventive bearing assembly has the advantage that width dimensions of the cylindrical roller bearing have no influence on the head spacing. A further advantage of the inventive bearing assembly in comparison to the bearing assembly wherein a cylindrical roller bearing is first attached to the shaft is that the inventive bearing assembly is less susceptible to misalignments.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved bearing assembly for a screw compressor.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

10 Angular contact ball bearing
12 Cylindrical roller bearing
14 Shaft
16 Center of mass
18 End region
20 Inner ring
22 Axial direction
24 Outer ring
26 Housing
28 Direction
30 Disc
32 Head spacing
34 Disc
36 Screw
38 Attachment element
40 Inner ring

What is claimed is:

1. A bearing assembly for supporting a screw-compressor rotor comprises:
a shaft having a center of mass, at least one angular contact ball bearing mounted on the shaft, and at least one cylindrical roller bearing mounted on the shaft, wherein a spacing from the at least one angular contact ball bearing to the center of mass is shorter than a spacing from the at least one cylindrical roller bearing to the center of mass, wherein the at least one angular contact ball bearing is disposed such that it transmits a force, which acts on an inner ring of the at least one angular contact ball bearing in an axial direction toward the center of mass of the shaft, through an outer ring of the at least one angular contact ball bearing onto a housing of the bearing assembly.

2. The bearing assembly according to claim 1, wherein the at least one cylindrical roller bearing is disposed on an end region of the shaft.

3. The bearing assembly according to claim 1, wherein the at least one cylindrical roller bearing has an NJ design, an NUP design, or an NJP design.

4. A screw compressor including a bearing assembly according to claim 1.

5. The bearing assembly according to claim 1, wherein the housing includes a housing shoulder and the shaft includes a shaft shoulder, wherein the at least one angular contact ball bearing includes an inner ring and an outer ring and a plurality of rolling elements disposed between the inner ring and the outer ring, wherein the at least one cylindrical roller bearing includes an inner ring and an outer ring and a plurality of roller elements disposed between the inner ring of the at least one cylindrical roller bearing and the outer ring of the at least one cylindrical roller bearing, and including a first disc between the outer ring of the at least one angular contact ball bearing and the housing shoulder and a second disc between an inner ring of the at least one angular contact ball bearing and the inner ring of the at least one cylindrical roller bearing.

6. The bearing assembly according to claim 5, wherein the first disc is in direct contact with the housing shoulder and the outer ring of the at least one angular contact ball bearing and wherein the second disc is in direct contact with the inner ring of the at least one angular contact ball bearing and the inner ring of the at least one cylindrical roller bearing.

7. The bearing assembly according to claim 6, wherein the outer ring of the at least one angular contact ball bearing is in direct contact with the outer ring of the at least one cylindrical roller bearing.

8. The bearing assembly according to claim 7, wherein the outer ring of the at least one cylindrical roller bearing includes a first flange and a second flange and wherein the inner ring of the at least one cylindrical roller bearing is flangeless.

9. The bearing assembly according to claim 1, wherein the at least one angular contact ball bearing comprises a plurality of balls and an inner ring and an outer ring, wherein the at least one cylindrical roller bearing comprises a plurality of rollers and an inner ring and an outer ring, and wherein a line joining a first point of contact between one of the plurality of balls and the outer ring and a second point of contact between the one of the plurality of balls and the inner ring extends radially inward of the inner ring of the at least one cylindrical roller bearing.

10. A screw compressor comprising:

the bearing assembly according to claim 9.

11. A screw compressor comprising:

the bearing assembly according to claim 9, the screw compressor rotor, and a housing in which the screw-compressor rotor is rotatably supported by the bearing assembly, wherein the screw compressor includes a head spacing.

12. A bearing assembly for supporting a screw-compressor rotor comprises:

a shaft having a center of mass, at least one angular contact ball bearing mounted on the shaft, and at least one cylindrical roller bearing mounted on the shaft, wherein a spacing from the at least one angular contact ball bearing to the center of mass is shorter than a spacing from the at least one cylindrical roller bearing to the center of mass, and wherein an axial bearing clearance of the bearing assembly, which is present when a force acts on an inner ring of the at least one angular contact ball bearing in axial direction away from the center of mass, is defined by a disc that forms a flange of the at least one cylindrical roller bearing.

13. A bearing assembly for supporting a screw-compressor rotor comprises:

a shaft having a center of mass, at least one angular contact ball bearing mounted on the shaft, and at least one cylindrical roller bearing mounted on the shaft, wherein a spacing from the at least one angular contact ball bearing to the center of mass is shorter than a spacing from the at least one cylindrical roller bearing to the center of mass, and including a disc disposed axially between an outer ring of the at least one angular contact ball bearing and a housing of the bearing assembly.

\* \* \* \* \*